No. 859,959. PATENTED JULY 16, 1907.
W. H. MARSH.
ROTARY ENGINE.
APPLICATION FILED FEB. 5, 1906.

2 SHEETS—SHEET 1.

WITNESSES:
W. W. Stirns,
E. J. Lyons.

INVENTOR
W. H. Marsh
BY
Frederick Benjamin
ATTORNEY

THE NORRIS PETERS CO., WASHINGTON, D. C.

No. 859,959.
PATENTED JULY 16, 1907.
W. H. MARSH.
ROTARY ENGINE.
APPLICATION FILED FEB. 5, 1906.
2 SHEETS—SHEET 2.
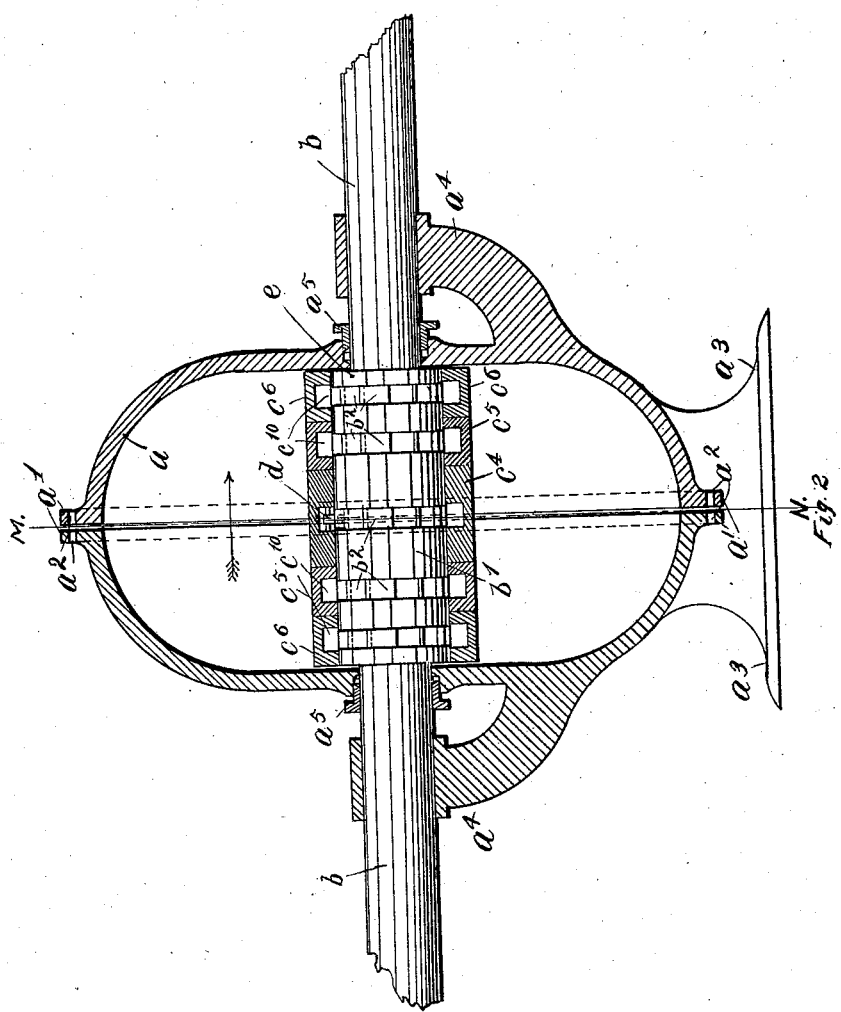
Witnesses:
Chas. F. Bassett
M. A. Milord.
Inventor
W. H. Marsh
By Frederick Benjamin
Atty.

UNITED STATES PATENT OFFICE.

WALLACE H. MARSH, OF HUMBOLDT, IOWA.

ROTARY ENGINE.

No. 859,959.  Specification of Letters Patent.  Patented July 16, 1907.

Application filed February 5, 1906. Serial No. 299,400.

*To all whom it may concern:*

Be it known that I, WALLACE H. MARSH, a citizen of the United States, residing at Humboldt, in the county of Humboldt and State of Iowa, have invented certain new and useful Improvements in Rotary Engines, of which the following is a specification.

My invention relates to rotary engines and especially to that type which is designed to utilize the expansive force of steam or other gas under pressure.

The chief objects of my invention are to produce a simple, efficient and economical primary source of power. In ordinary engines of this class, which must necessarily be run at a high rate of speed, the multiplicity of parts which enter into their construction conduce to excessive wear and tend to shorten the life of the machine. In order to avoid this defect, I have constructed my improved motor with comparatively few parts therefore greatly enhancing its durability, and rendering it less likely to get out of order. By the construction herein shown, supplemented by suitable mechanically controlled valves, the expansive force of the steam or gas can be utilized to the fullest extent compatible with economy of use.

A further advantage lies in the small cost to manufacture, for the parts are not only few and simple, but do not require the fine adjustment so often called for in mechanism of that class, nor does the machine work necessitate greater than ordinary skill.

Figure 1:
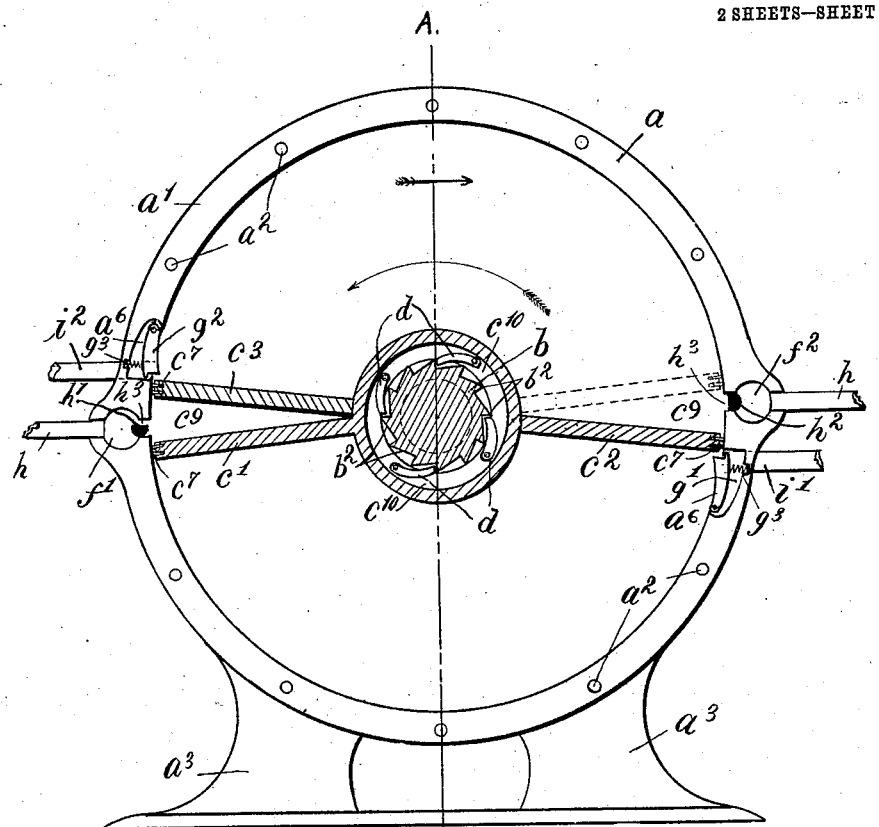
Figure 3:
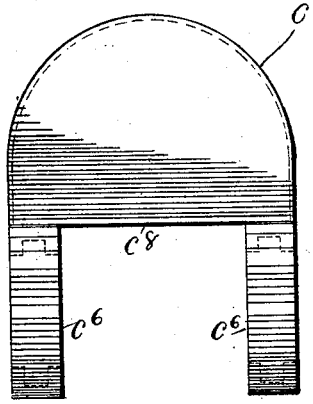
Figure 4:
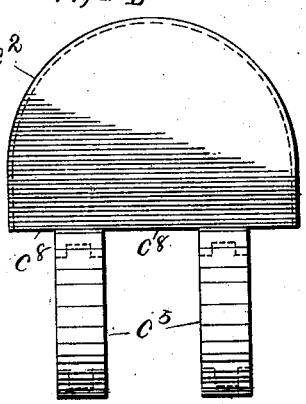
Figure 5:
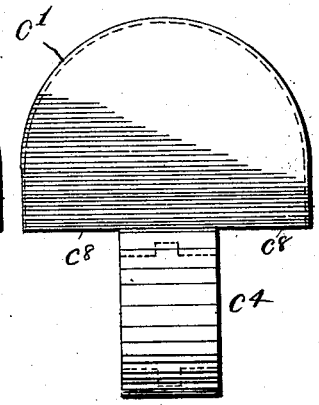

In the accompanying drawing—Figure 1 is a sectional view of my improved rotary engine taken on the line M—N of Fig. 2; Fig. 2 is a sectional view taken on the line A—B of Fig. 1; Figs. 3, 4, and 5, are views in elevation of the propelling blades.

Referring to the drawings—the cylinder $a$, is constructed in two pieces, each piece forming one half of the complete cylinder, and furnished with meeting flanges $a^1$ having holes $a^2$ by means of which the said halves can be securely bolted together, suitable gas tight packing rings being interposed between the flanges. Each cylinder half has a base $a^3$ cast integral therewith.

A shaft $b$ passes through the center of curvature of the cylinder and is journaled in bearings $a^4$ formed integral with the cylinder halves. Packing rings $a^5$ are provided to render the joint steam tight where the shaft $b$ enters the cylinder. Within the cylinder the shaft $b$ is provided with a hub $b^1$ formed integral therewith upon which are journaled propelling blades $c^1$, $c^2$, $c^3$, by means of collars $c^4$, $c^5$, $c^6$, which encircle said hub. One of the propellers $c^1$ is formed with a single collar $c^4$ the propeller $c^2$ centrally located having two collars $c^5$ which are separated by an interval which is occupied by the collar $c^4$ of the propeller $c^1$. The propeller $c^3$ also has two collars $c^6$ separated by an interval sufficient to include the collars of both the propellers $c^1$, $c^2$. If any one propeller is rotated when mounted upon the shaft its lower edge $c^8$ will come in contact with the lower edge of the next blade, and if the rotary movement of the first propeller is continued further it will carry the second propeller with it. I make use of this fact in order to change the relative positions of the blades from operative to inoperative positions and vice versa as hereinafter described. It will be evident that the contiguous faces of the propellers whose lower edges are in engagement as aforesaid cannot come in contact with each other but will remain at a divergent angle thus forming a chamber $c^9$ into which gas or steam is conducted as hereinafter described.

The peripheral contour of each propeller corresponds to the internal curvature of the cylinder in the plane at right angles to its direction of rotation, and is adapted to fit steam or gas tight within the cylinder by means of packing rings $c^7$ which are inserted in that portion of the propeller which is curved to fit the cylinder.

The internal surfaces of the collars $c^4$, $c^5$, $c^6$, are furnished with channels $c^{10}$ within which are pivotally mounted pawls $d$ which engage a series of ratchet teeth $b^2$ formed upon the periphery of said hub $b^1$ there being a plurality of said pawls for each collar, to give greater strength and certainty of action.

Steam is admitted through supply pipes $h$, $h$, to valve chambers $f^1$, $f^2$, which communicate with the interior of the cylinder by openings $h^3$ supplied with valves $h^1$, $h^2$, and is exhausted through ports $i^1$, $i^2$. In order to prevent backward movement of the propeller blades, I provide dogs $g^1$, $g^2$, which are pivoted in recesses $a^6$ in the cylinder walls and are held in extended position by springs $g^3$, said extended position being the operative position.

Having thus described the form and mechanical construction of my improved rotary engine, I will now set forth briefly the method by which it is operated.

By reference to Fig. 1, it will be seen that two of the propellers $c^1$ and $c^3$ are located on one side of the cylinder in as close proximity to each other as their construction will permit leaving a chamber $c^9$, previously mentioned, between their opposing surfaces. The valve chamber $f^1$ is in communication with the said chamber $c^9$ through the opening $h^3$. If, now, the valve $h^1$ is open the steam or gas under pressure will force the propeller $c^1$ in the direction of the arrow carrying it onward until its lower edge $c^8$ impinges against the corresponding part of the propeller $c^2$, carrying the latter onward with it past the valve port $h^3$ until propeller $c^2$ occupies the position indicated by dotted lines, and the blade $c^1$ will occupy the position previously held by propeller $c^2$, where it will be engaged by the dog $g^1$ to prevent any reverse movement, the steam which has been utilized in the movement thus described, being exhausted through the port $i^1$. If the port $h^2$ is now opened the steam pressure will force the blade $c^2$ in the direction of the arrow, the plate $c^1$ being held by the dog $g^1$. When the blade $c^2$ impinges against the blade $c^3$ it will carry the latter to the position formerly occupied by the blade $c^1$ and so designated in the drawing, Fig. 1. The blade $c^2$ will pass the exhaust port $i^1$ and the dog $f^2$ will engage its periphery so that it will occupy the position formerly occupied by the blade $c^3$ and so designated in the drawing. If now the valve $h^1$ is opened steam will again fill the chamber $c^9$ forcing the blade $c^3$ (which now occupies the position designated $c^1$) in the direction of the arrow, until it reaches the position designated $c^2$, carrying the blade $c^1$, which was occupying the position designated $c^2$ to the position shown in dotted lines. Thus it will be seen that the propellers follow each other *seriatim* in the rotary movement, alternately propelling the shaft and opposing the backward pressure of the operative agent, the gas under pressure.

It is evident that many changes may be made in the form and construction of my invention without departing from the scope and spirit thereof. For instance, while I have shown three propellers the number may be varied as desired; thus four may be used or the same result can be obtained by two properly mounted. Hence I do not wish to be limited to the precise construction set forth, but

Having thus described my invention what I claim as new and desire to secure by Letters Patent, is:—

1. A rotary engine, including a cylinder having inlet and eduction ports and valves, a shaft extending through said cylinder, a propeller consisting of more than two blades, each blade being independently journaled upon said shaft within the cylinder, means for rotating the said blades and means for simultaneously locking a plurality of the blades against a reverse movement.

2. A rotary engine, including a cylinder having inlet and exhaust ports and valves, a shaft located concentric with the curvature of said cylinder and provided with a hub within the cylinder, a plurality of propeller blades journaled on said hub, means for rotating said blades *seriatim*, means for locking said blades against a reverse movement, said locking means consisting of a plurality of dogs mounted upon the cylinder casing, and means for imparting motion from the propeller blades to said shaft.

3. A rotary engine, including a cylinder provided with inlet and exhaust ports and valves, a shaft concentric with the periphery of said cylinder and provided with a hub located within the cylinder, a plurality of propeller blades independently journaled on said hub, a series of dogs carried by the propeller blades and adapted to engage teeth on said hub and a plurality of dogs mounted upon the cylinder casing and adapted to engage the said blades.

4. A rotary engine, including a cylinder provided with inlet and eduction ports and valves, a shaft concentric with the periphery of said cylinder and provided with a hub located within the cylinder, a plurality of propeller blades independently journaled on said hub, a series of gravity dogs carried by said propeller blades and adapted to engage teeth on said hub to impart motion thereto, and a plurality of spring actuated dogs peripherally mounted within the cylinder and adapted to simultaneously engage a plurality of said propeller blades.

5. A rotary engine including a bi-sected cylinder having its internal bore formed in at least one plane with a circular contour, a shaft passing transversely through said cylinder at the center of its circular contour, a hub for said shaft within the cylinder, a plurality of propellers revolubly mounted on said hub, a series of rachet teeth formed on the periphery of said hub, a plurality of dogs mounted upon the bearings of each propeller and adapted to engage said series of ratchet teeth, means for imparting motion to the propellers *seriatim*, means for imparting motion from one propeller to another and yielding means for preventing backward rotation of the propellers.

In testimony whereof I affix my signature in presence of two witnesses.

WALLACE H. MARSH.

Witnesses:
A. E. RUSE,
W. W. STERNS.